United States Patent [19]
Clarke

[11] Patent Number: 5,368,141
[45] Date of Patent: Nov. 29, 1994

[54] DISPLACEMENT SENSITIVE VALVE MECHANISM

[75] Inventor: William H. Clarke, Farmington Hills, Mich.

[73] Assignee: Ford Motor Company, Dearborn, Mich.

[21] Appl. No.: 173,008

[22] Filed: Dec. 27, 1993

[51] Int. Cl.$^5$ ............................................. F16F 9/34
[52] U.S. Cl. ........................................ 188/284; 188/282
[58] Field of Search ............... 188/284, 280, 322.13, 188/322.16, 322.17, 314, 315, 281, 282, 316, 317, 285, 286, 287, 288, 322.22, 322.15; 267/221, 226, 124

[56] References Cited

U.S. PATENT DOCUMENTS

| | | | |
|---|---|---|---|
| 2,606,630 | 8/1952 | Rossman | 188/284 |
| 3,706,362 | 12/1972 | Faure | 188/282 |
| 4,325,468 | 4/1982 | Siorek | 188/282 |
| 4,328,960 | 5/1982 | Handke et al. | 188/284 |
| 4,397,452 | 8/1983 | Fouts | 267/8 R |
| 4,474,271 | 10/1984 | Molders et al. | 188/280 |
| 4,527,674 | 7/1985 | Mourray | 188/284 |
| 4,596,321 | 6/1986 | Harper et al. | 188/322.15 |
| 4,838,393 | 6/1989 | Mourray et al. | 188/284 |
| 5,024,301 | 6/1991 | Cook | 188/287 |
| 5,186,439 | 2/1993 | McDonagh et al. | 267/35 |

FOREIGN PATENT DOCUMENTS 2158181 11/1985 United Kingdom ............... 188/284

*Primary Examiner*—Douglas C. Butler
*Attorney, Agent, or Firm*—Gregory P. Brown; Roger L. May

[57] ABSTRACT

A displacement sensitive valve mechanism incorporated in a shock absorber for a motor vehicle suspension which provides substantially unrestricted hydraulic flow between a first rebound chamber and a second rebound chamber through a first range of displacement of a piston rod and progressively restricts the hydraulic flow between the first rebound chamber and the second rebound chamber during a second range of displacement of the piston, thereby progressively increasing the dampening force resisting displacement of the piston in the second range of displacement.

18 Claims, 2 Drawing Sheets

DISPLACEMENT SENSITIVE VALVE MECHANISM

FIELD OF THE INVENTION

This invention relates to shock absorbers for use in suspensions of motor vehicles. More particularly, the present invention relates to the use of a displacement sensitive piston for hydraulically resisting extreme rebound displacements of a motor vehicle suspension.

BACKGROUND OF THE INVENTION

Shock absorbers are designed to dampen relative motion between a wheel and chassis of a motor vehicle. They are often designed such that the dampening rate of the shock becomes higher at either extreme of the suspension displacement, namely rebound and jounce. A variety of mechanisms increase resistance to extreme jounce and rebound suspension movements. Rebound springs and elastomeric jounce bumpers have been used internally and externally of the working cylinder. In addition, secondary pistons have been used which become operative only at the extreme ends of the piston rod stroke.

The present invention is directed at controlling extreme rebound suspension motions. Conventional rebound control mechanisms present an undesirable ride harshness when a suspension extends into rebound limits of travel. There are two components to the undesirable harshness: switching harshness and rebound stop harshness. Switching harshness results when the shock changes over to a higher dampening rate to assist resisting the sudden impact of the suspension at the extreme suspension extension. Rebound stop harshness results when the suspension reaches its mechanical limit of travel, and the suspension components stop relative motion between the wheel and chassis. Passengers perceive these events as undesirable.

It would be desirable to provide a shock absorber capable of increasing the hydraulic resistance and a providing a hydraulic stop without undesirable switching harshness.

SUMMARY OF THE INVENTION

The present invention advances beyond the systems described above by providing a suspension shock absorber for a motor vehicle. The shock absorber includes a working cylinder, a piston rod and a piston mounted thereon and sized to be slidably received within the working cylinder and dividing the cylinder into jounce and rebound chambers. The piston further includes flow control means constructed to provide a restrictive fluid passage for the controlled flow of hydraulic fluid from one of the chambers to the other of the chambers when the piston is moved in the working cylinder to thereby create a dampening force. The shock absorber also includes an end closure closing one end of the working cylinder and having an opening to slidably receive the piston rod therethrough. The shock absorber further includes displacement sensitive valve means disposed coaxially about the piston rod within the working cylinder and dividing the rebound chamber into a first rebound chamber and a second rebound chamber. The displacement sensitive valve means provides substantially unrestricted hydraulic flow between the first rebound chamber and the second rebound chamber through a first range of displacement of the piston rod and progressively restricts the hydraulic flow between the first rebound chamber and the second rebound chamber during a second range of displacement of the piston, thereby progressively increasing the dampening force resisting displacement of the piston in the second range of displacement.

It is an advantage of the present invention to provide progressively increasing hydraulic resistance to extreme rebound travel of a motor vehicle suspension system without perceptible switching harshness.

It is another advantage of the present invention to provide a hydraulic rebound stop mechanism, thereby eliminating the need for and harshness associated with mechanical rebound stops.

Other objects, features and advantages of the present invention will become apparent to those skilled in the art from the drawings, detailed description and claims which follow.

DESCRIPTION OF THE PREFERRED EMBODIMENT

Figure 1:
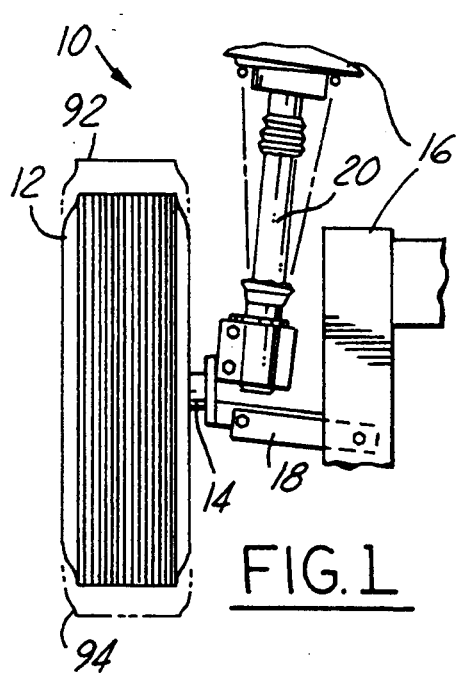
FIG. 1 is a front elevational view illustrating a motor vehicle suspension incorporating a strut capable of embodying the present invention.
Figure 2:
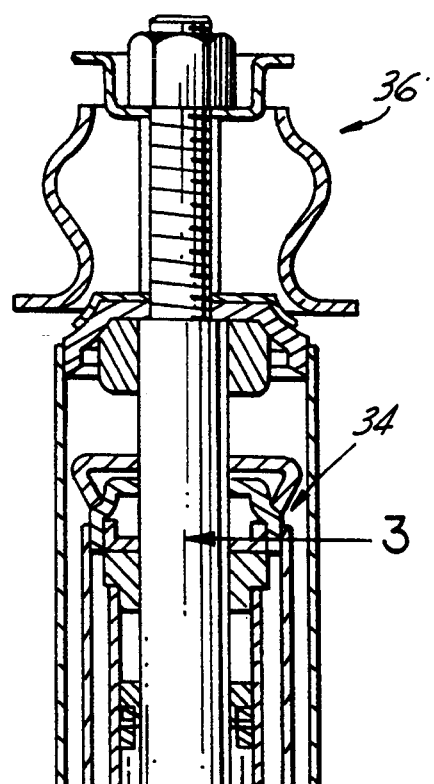
FIG. 2 is a front elevational and partially sectioned view of a suspension strut having a shock absorber constructed according to the present invention.

Referring now to FIGS. 1 and 2, a motor vehicle suspension 10 is illustrated including a tire 12, a spindle assembly 14, a chassis 16, a lower arm 18 and a strut 20 pivotably connecting the spindle 14 to the chassis 16. The strut 20 incorporates a shock absorber mechanism having a working cylinder 22, an outer cylinder 24, a base valve 26, a piston 28, a piston rod 30, a rod guide 31, a spindle bracket 32, a closure assembly 34 and a mounting assembly 36, all as are commonly known in the suspension art. The piston 28 divides the working cylinder 22 into a main jounce chamber 38 and a main rebound chamber 40. The piston 28 includes a valve system which restricts the flow of hydraulic fluid therethrough to create a dampening force as is commonly known in the suspension art. In addition, a displacement sensitive valve means is mounted within the main rebound chamber 40 of the working cylinder 22 above the piston 28 and about the piston rod 30 for providing variable rebound resistance.

Figure 3:
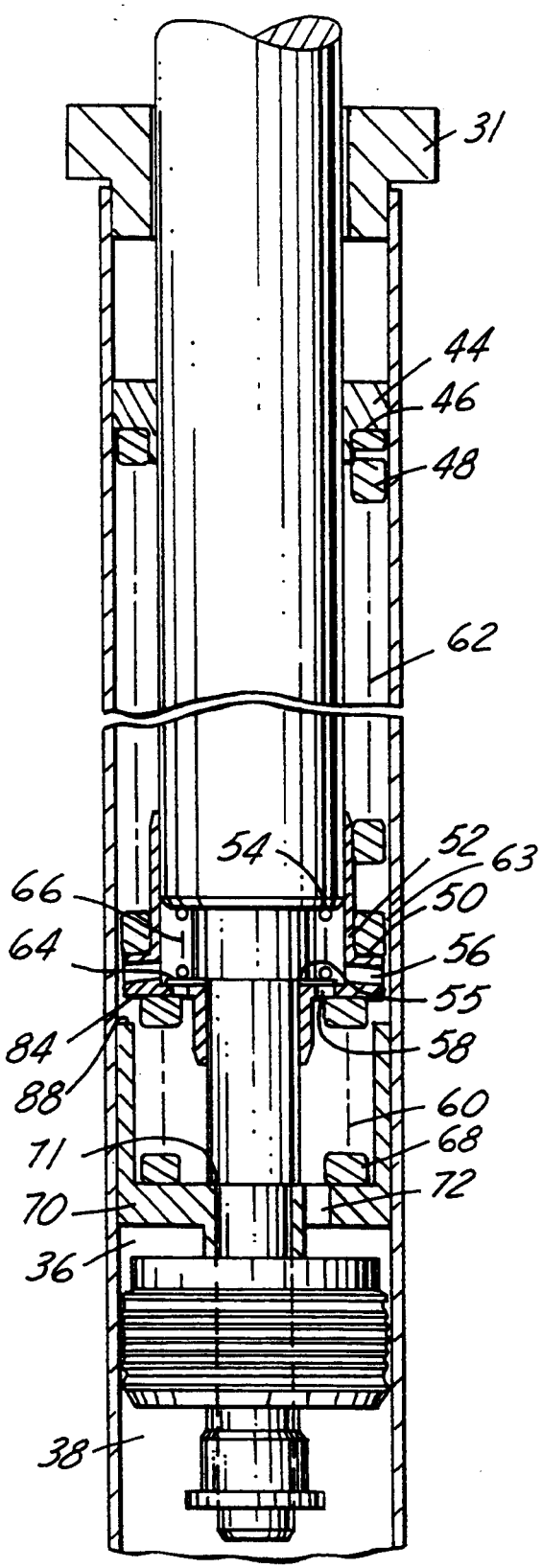
FIG. 3 is a fragmented side elevational and sectional view of a shock absorber operating in a first range of piston rod displacement taken along line 3—3 of FIG. 2.

Referring to FIG. 3, the displacement sensitive valve means includes an annular spring cap 44 slidably disposed coaxially about the piston rod just below the rod guide 31. An upper spring seat 46 is disposed on a lower surface of the spring cap 44. A rebound spring 48 is disposed coaxially about the piston rod 30 and seated in the upper spring seat 46 and extends downward to a lower spring seat 50 disposed on a rebound valve 52.

Figure 4:
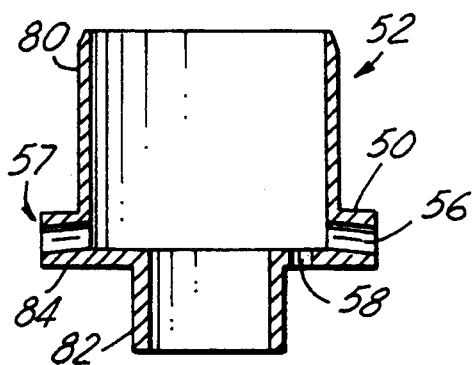
FIG. 4 is a sectional view of a rebound valve taken along line 3—3 of FIG. 2 according to the present invention.

As illustrated in FIGS. 3 and 4, rebound valve 52 is disposed slidably about first and second shoulders 54, 55 of the piston rod 30 and divides the main rebound chamber 40 into first and second rebound chambers 60, 62 within main rebound chamber 40. The rebound valve 52 includes a circumferentially disposed, radially extending annular ring 57, and a plurality of radial passages 56 passing therethrough. The annular ring 57 has a diameter that is less than the inner diameter of the working cylinder 12 to allow hydraulic fluid flow through the annular region 63 therebetween. Rebound valve 52 includes axial passages 58 for the passage of hydraulic fluid from the first rebound chamber 60 to the second rebound chamber 62. Spring seat 50 is formed on upper surface of the annular ring 57. Rebound valve 52 also includes axially aligned upper and lower valve guides 80, 82 having bore diameters slightly larger than the outside diameter of the corresponding portion of the piston rod 30. The valve guides stabilize the rebound valve 52 during operation. A valve sealing surface 84 is circumferentially disposed on the lower portion of ring 57.

Referring back now to FIG. 3, a check valve means is shown including a check valve spring 66 seated against the first shoulder 54 of the piston rod 31 which urges a check valve 64 against the axial passages 58. A proportioning spring 68 is disposed between rebound valve 52 and a displacement sensitive piston 70.

Figure 5:
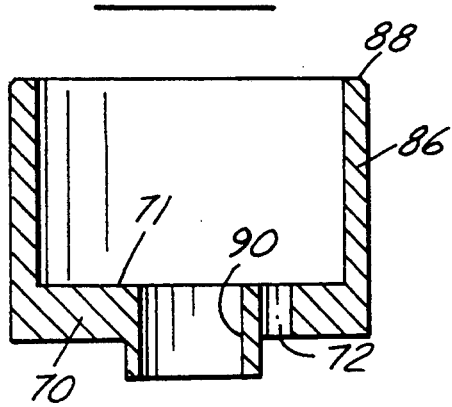
FIG. 5 is a sectional view of a displacement sensitive piston taken along line 4—4 of FIG. 2 according to the present invention.

As illustrated in FIGS. 3 and 5, displacement sensitive piston 70 is fixedly attached about a third shoulder 71 on the piston rod 30 and sealingly disposed within the working cylinder 12. The displacement sensitive piston 70 includes an axially aligned orifice 72 for the unrestricted passage of hydraulic fluid. The displacement sensitive piston 70 includes a spring guide 86 for receiving the proportioning spring 68 therein. The piston sealing surface 88 is disposed on the upper surface of the spring guide 86. Relative motion between the piston rod 30 and the displacement sensitive piston 70 is prevented by providing a tolerance fit between the small piston bore 90 and the corresponding portion of the piston rod 30. Those skilled in the art will appreciate the means of attaching the piston 70 to the piston rod may comprise other mounting means conventional to shock absorber design and application.

The rebound valve 52 and displacement sensitive piston 70 can be made from materials capable of sustaining compressive and tensile loads. In the preferred embodiment, the rebound valve 52 and piston 70 are made utilizing sintered metal technology, however the invention is not so limited. Alternative materials including, but not limited to, die cast metals, stamped steels and high strength synthetic polymeric materials such as high strength polycarbonate would function equally well.

Operation of the present invention can be seen more clearly by referring to FIGS. 1, 2, 3 and 6. As shown in FIG. 1, upward motion of the wheel 12, as indicated by phantom lines 92, is referred to as jounce. Similarly, downward motion of the wheel 12, as indicated by phantom lines 94, is referred to as rebound. As shown in FIGS. 2 and 3, when the suspension operates in a first range of displacement between extreme jounce and rebound positions, rebound spring 48 is in a free state, and the rebound valve 52 does not move relative to the piston rod 30 or the displacement sensitive piston 70.

Referring to FIG. 3, hydraulic fluid flows freely between jounce and rebound chambers 38, 40 while the piston rod is in its first range of displacement as in a conventional shock absorber. Fluid in the rebound chamber 40 flows from the first rebound chamber 60 to the second rebound chamber 62 by passing through orifice 72 and passing through the valve opening between the rebound valve 52 and the displacement sensitive piston 70. The check valve 64 is continuously urged in a closed position 66 in the first range of displacement.

Figure 6:
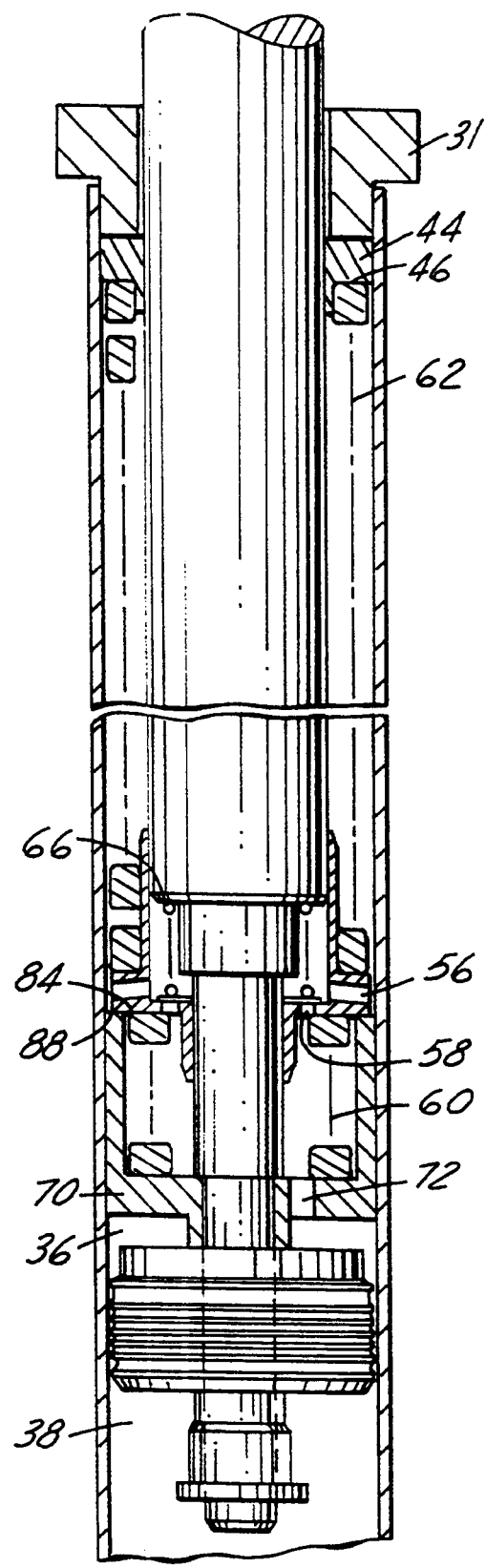
FIG. 6 is a fragmented side elevational and sectional view of a shock absorber operating in a second range of piston rod displacement taken along line 3—3 of FIG. 2.

Referring now to FIG. 6, when the suspension approaches the extreme rebound position, piston rod 30 is extended substantially from the working cylinder 22 and the spring cap 44 is driven into the rod guide 31. As the piston rod 30 travels further into rebound, rebound spring 48 is compressed, thereby increasing resistance of the rebound motion. Simultaneously, the proportioning spring 68 compresses, and the rebound valve 52 moves toward the displacement sensitive piston 70. The distance between the valve sealing surface 84 and the piston sealing surface 88 is thereby progressively reduced in proportion to the displacement of the piston rod 30, which increases the resistance to hydraulic flow therethrough. This provides additional progressive resistance to the rebound motion. The rate of rebound valve 52 closure is, therefore, a function of the stiffness of the rebound spring 48 and the proportioning spring 68. In general the rebound valve 52 closes according to the following relationship:

$$Xv = (Kr/Kp)*Xr$$

where:
  $Xv$ = rebound valve displacement relative to the displacement sensitive piston;
  $Xr$ = deflection of rebound spring in extreme rebound;
  $Kr$ = rebound spring stiffness; and
  $Kp$ = proportioning spring stiffness.

As shown in FIG. 6, at the limit of rebound travel, the valve may be designed to completely close, thereby hydraulically locking the suspension travel. In this configuration, in addition to reducing the switching harshness, the present invention can eliminate the need for an elastomeric rebound stop. Alternatively, an elastomeric rebound stop can be used if the present invention is not designed to provide hydraulic lock.

In a hydraulically locked condition the proportioning spring 68 is compressed allowing check valve spring 66 to simultaneously expand, thereby reducing the resistance against check valve 64. As the piston rod 30 resumes jounce motion, fluid is displaced from the jounce chamber 38 into the rebound chamber 36. When the rebound valve 52 is in the locked position a differential pressure acting on the area of the check valve 64 compresses check valve spring 66 allowing fluid to flow through the axial passages 58 in the rebound valve 52. As the piston rod 30 travels from the second range of displacement to the first range of displacement, the rebound valve opening increases, decreasing the pressure differential on the check valve 64. Eventually the check valve spring 66 is compressed, as shown in FIG. 3, closing the check valve 64.

Various other modifications and permutations of the present invention, no doubt, will occur to those skilled in the art. Therefore, it is the following claims, including all equivalents, which define the scope of the present invention.

I claim:
  1. A suspension apparatus for a motor vehicle comprising:
    a working cylinder;

a rod guide;

a piston rod and a piston mounted thereon sized to be slidably received within said working cylinder and dividing said cylinder into jounce and rebound chambers;

said piston having flow control means constructed to provide a restrictive fluid passage for the controlled flow of hydraulic fluid from one of said chambers to the other of said chambers when said piston is moved in said working cylinder to thereby create a dampening force;

an end closure closing one end of said working cylinder and having an opening to slidably receive said piston rod therethrough;

rebound valve means slidably mounted coaxially on said piston rod within said working cylinder and between first and second rebound chambers, said rebound valve means being adapted to provide unrestricted hydraulic flow from said first rebound chamber to said second rebound chamber during a first range of displacement of said piston rod and progressively restrict hydraulic flow from said first rebound chamber to said second rebound chamber during a second range of displacement of said piston rod, thereby increasing the dampening force to resist motion of said piston rod during said second range of displacement;

a proportioning spring means for urging said rebound valve means into an unrestrictive flow condition; and a rebound spring means for urging said rebound valve means into a hydraulic flow restricting position when said piston passes through said second range of displacement, said rebound spring means being disposed coaxially on said piston rod within said working cylinder.

2. A suspension apparatus according to claim 1, wherein said rebound valve means includes check valve means for allowing unidirectional passage of hydraulic fluid thereby creating displacement proportional dampening forces for extreme rebound motions of said piston rod in said second range of displacement.

3. A suspension apparatus according to claim 1, wherein closure of said rebound valve means against said displacement sensitive piston is related by the following relationship:

Xv=(Kr/Kp)*Xr where:
Xv=rebound valve displacement relative to the displacement sensitive piston;
Xr=deflection of rebound spring in extreme rebound;
Kr=rebound spring stiffness; and
Kp=proportioning spring stiffness.

4. A suspension apparatus according to claim 1, wherein said piston rod includes a second shoulder for limiting travel of said rebound valve means.

5. A suspension apparatus according to claim 1, wherein said displacement sensitive valve means further comprises:

an annular spring cap slidably disposed coaxially on said piston rod and adjacent to said rod guide, said spring cap having a first spring seat;

said rebound spring means comprises a coil spring coaxially disposed about said piston rod between said spring cap and said rebound valve means; and said proportioning spring means comprises a coil spring coaxially disposed on said piston rod below said rebound valve means.

6. A suspension apparatus according to claim 1, wherein said rebound spring means is in a free state through said first range of displacement and a progressively compressed state through said second range of displacement.

7. A suspension apparatus according to claim 6, wherein said proportioning spring means constantly urges said rebound valve means into an unrestrictive flow condition throughout said first range of displacement and said rebound spring means compresses said proportioning spring and urges said rebound valve means closed proportionally to the compression of said rebound spring means.

8. A suspension apparatus according to claim 1, wherein said displacement sensitive valve means further includes a displacement sensitive piston coaxially mounted on said piston rod within said rebound chamber of said working cylinder adjacent to said piston.

9. A suspension apparatus according to claim 8, wherein said displacement sensitive piston includes an orifice to provide unrestricted hydraulic flow.

10. A suspension apparatus according to claim 8, wherein said displacement sensitive piston is secured to said piston rod.

11. A suspension apparatus according to claim 8, wherein said piston rod includes a shoulder for securing said displacement sensitive piston.

12. A suspension apparatus for an motor vehicle comprising:

a working cylinder;

a piston rod and a piston mounted thereon sized to be slidably received within said working cylinder and dividing said cylinder into jounce and rebound chambers;

said piston having flow control means constructed to provide a restrictive fluid passage for the controlled flow of hydraulic fluid from one of said chambers to the other of said chambers when said piston is moved in said working cylinder to thereby create a dampening force;

an end closure closing one end of said working cylinder and having an opening to slidably receive said piston rod;

a rod guide;

an annular spring cap slidably disposed within said working cylinder and slidably disposed coaxially about said piston rod and adjacent to said rod guide;

a rebound spring disposed coaxially about said piston rod within said working cylinder and seated against said annular spring cap;

a displacement sensitive piston sealingly disposed within said working cylinder and coaxially mounted on said piston rod within said rebound chamber and adjacent to said piston;

a proportioning spring; and a rebound valve means slidably mounted coaxially on said piston rod and adjacent to said piston within said working cylinder and dividing said rebound chamber into first and second rebound chambers, said rebound valve means being adapted to provide unrestricted hydraulic flow from said first rebound chamber to said second rebound chamber during a first range of displacement of said piston rod and progressively restricts the hydraulic flow between said first rebound chamber and said second rebound chamber during a second range of displacement of said piston rod, thereby progressively increasing the dampening force resisting motion of said piston rod during said second range of displacement.

13. A suspension apparatus according to claim 12, wherein said displacement sensitive piston includes an orifice to provide unrestricted hydraulic flow therethrough.

14. A suspension apparatus according to claim 12, wherein said displacement sensitive piston is secured to said piston rod.

15. A suspension apparatus according to claim 12, wherein said rebound valve means includes check valve means for allowing unidirectional hydraulic fluid flow therethrough, thereby reducing hydraulic flow restriction for jounce travel of said piston rod in said second range of displacement.

16. A suspension apparatus according to claim 12, wherein closure of said rebound valve means against said displacement sensitive piston is related by the following relationship:

$$Xv = (Kr/Kp)*Xr$$

where:
- $Xv$ = rebound valve displacement relative to the displacement sensitive piston;
- $Xr$ = displacement in extreme rebound;
- $Kr$ = rebound spring stiffness; and
- $Kp$ = proportioning spring stiffness.

17. A suspension apparatus according to claim 12, wherein said apparatus is incorporated in a shock absorber.

18. A suspension apparatus according to claim 12, wherein said apparatus is incorporated in a suspension strut assembly.

* * * * *